US008893980B2

(12) United States Patent
Scott et al.

(10) Patent No.: US 8,893,980 B2
(45) Date of Patent: Nov. 25, 2014

(54) DELAYED EXECUTION AND AUTOMATED MODEL DETECTION FOR AIR MOVING DEVICES

(75) Inventors: Iain Scott, Pasig (PH); Michael B. Dizon, Caloocan (PH); Gordon Currie, Quezon (PH)

(73) Assignee: Astec International Limited, Kwun Tong, Kowloon (HK)

( * ) Notice: Subject to any disclaimer, the term of this patent is extended or adjusted under 35 U.S.C. 154(b) by 690 days.

(21) Appl. No.: 12/893,157

(22) Filed: Sep. 29, 2010

(65) Prior Publication Data
US 2012/0074237 A1 Mar. 29, 2012

(51) Int. Cl.
*H05K 7/20* (2006.01)
*F24F 11/00* (2006.01)

(52) U.S. Cl.
CPC ........... *F24F 11/0079* (2013.01); *Y02B 30/746* (2013.01); *F24F 11/0012* (2013.01)
USPC .......... 236/49.3; 236/46 R; 236/97; 62/259.2; 318/471

(58) Field of Classification Search
USPC ................ 62/46 R, 49.3, 97, 259.2; 318/471; 236/46 R, 49.3, 97; 361/688
See application file for complete search history.

(56) References Cited

U.S. PATENT DOCUMENTS

| | | | | |
|---|---|---|---|---|
| 5,011,073 | A * | 4/1991 | Izaguirre et al. | 236/11 |
| 5,777,897 | A | 7/1998 | Giorgio | |
| 5,931,004 | A * | 8/1999 | Yoo et al. | 62/82 |
| 6,134,667 | A | 10/2000 | Suzuki et al. | |
| 6,182,902 | B1 | 2/2001 | Shih | |
| 6,481,222 | B1 * | 11/2002 | Denniston | 62/94 |
| 6,487,463 | B1 | 11/2002 | Stepp, III | |
| 6,573,671 | B2 | 6/2003 | Montero et al. | |
| 6,597,972 | B2 | 7/2003 | Emberty et al. | |
| 6,735,499 | B2 | 5/2004 | Ohki et al. | |
| 6,737,824 | B1 | 5/2004 | Aslan et al. | |
| 6,757,592 | B1 | 6/2004 | Henderson et al. | |
| 6,757,617 | B2 | 6/2004 | Dixon et al. | |
| 6,873,883 | B2 | 3/2005 | Ziarnik | |
| 6,931,306 | B2 | 8/2005 | Frankel et al. | |
| 7,305,316 | B2 | 12/2007 | Frankel et al. | |
| 7,313,466 | B2 * | 12/2007 | Chang | 700/300 |

(Continued)

FOREIGN PATENT DOCUMENTS

| | | |
|---|---|---|
| JP | 55-8260 | 1/1980 |
| JP | 2-52927 | 2/1990 |

OTHER PUBLICATIONS

"Implementing PWM Fan Speed Control Within a Computer Chassis Power Supply"; A. Arredondo, P. Roy and E. Wofford; IEEE 2005; pp. 148-151.

*Primary Examiner* — Jonathan Bradford
(74) *Attorney, Agent, or Firm* — Harness, Dickey & Pierce, P.L.C.

(57) ABSTRACT

Various methods related to air moving devices in electronic systems are disclosed. Various electronic systems including controlled air moving devices are also disclosed. Thus, one example electronic system includes an air moving device, a sensor for monitoring an operating parameter of the electronic system and generating a signal representative of the operating parameter, and a controller for controlling the air moving device. The controller is configured to selectively control a rotational speed of the air moving device, to receive the signal representative of the operating parameter, and to delay changing the rotational speed of the air moving device in response to the signal representative of the operating parameter.

17 Claims, 4 Drawing Sheets

(56) References Cited

U.S. PATENT DOCUMENTS

| | | |
|---|---|---|
| 7,337,018 B2 | 2/2008 | Espinoza-Ibarra et al. |
| 7,355,359 B2 * | 4/2008 | Kuo ............................... 318/268 |
| 7,483,270 B2 | 1/2009 | Blake |
| 7,490,479 B2 | 2/2009 | Byquist et al. |
| 7,562,537 B2 | 7/2009 | Liebenow |
| 7,606,640 B2 | 10/2009 | Hirai et al. |
| 7,621,460 B2 | 11/2009 | Dorr |
| 7,708,056 B2 | 5/2010 | Shen et al. |
| 7,721,120 B2 | 5/2010 | Bodner et al. |
| 7,890,219 B2 | 2/2011 | Tuma |
| 7,948,196 B2 | 5/2011 | Begun et al. |
| 7,974,743 B2 | 7/2011 | Nakashima et al. |
| 8,145,926 B2 | 3/2012 | Park et al. |
| 8,150,561 B2 | 4/2012 | Shimotono et al. |
| 8,224,498 B2 | 7/2012 | Guan |
| 8,237,386 B2 | 8/2012 | Culbert et al. |
| 8,292,593 B2 | 10/2012 | Orr et al. |
| 8,340,922 B2 | 12/2012 | Wang et al. |
| 8,387,890 B2 | 3/2013 | Crocker et al. |
| 8,401,803 B2 | 3/2013 | Miettinen |
| 8,448,000 B2 | 5/2013 | Culbert et al. |
| 8,560,132 B2 | 10/2013 | Matteson |
| 2005/0217290 A1 * | 10/2005 | Watakabe et al. ............... 62/183 |
| 2006/0032250 A1 * | 2/2006 | Flanigan et al. ................ 62/157 |
| 2007/0153443 A1 | 7/2007 | Lyons et al. |
| 2008/0198546 A1 * | 8/2008 | Pearce et al. ................... 361/687 |
| 2009/0073731 A1 | 3/2009 | Phadke et al. |
| 2011/0018479 A1 * | 1/2011 | Pan ............................... 318/268 |
| 2011/0293439 A1 | 12/2011 | Imaizumi et al. |
| 2012/0078420 A1 | 3/2012 | Jensen et al. |

\* cited by examiner

DELAYED EXECUTION AND AUTOMATED MODEL DETECTION FOR AIR MOVING DEVICES

FIELD

The present disclosure relates to air moving device control techniques and electronic systems including controlled air moving devices.

BACKGROUND

This section provides background information related to the present disclosure which is not necessarily prior art.

Air moving devices (AMDs), e.g., fans, are commonly used for cooling electronic systems. AMDs are commonly controlled using analog and/or simple digital control techniques. Some of the common modes of operation for AMDs include controlling AMD rotational speed based on ambient temperature, controlling AMD rotational speed based on a difference between an inlet temperature and an outlet temperature of the electronic system including the AMD, controlling AMD rotational speed based on a temperature of a single component, device, etc. of an electronic system including the AMD, controlling AMD rotational speed based on a temperature of more than one component, device, etc. of an electronic system including the AMD. The aforementioned modes of operation may include over temperature protection and/or also consider a load on the electronic system.

The inventors of the techniques, and systems disclosed herein have realized that there are areas in which current AMD control techniques and systems are lacking.

SUMMARY

This section provides a general summary of the disclosure, and is not a comprehensive disclosure of its full scope or all of its features.

According to an aspect of the present disclosure, a method of controlling an air moving device in an electronic system is disclosed. The air moving device is operable to accelerate between rotational speeds at a maximum angular acceleration. The method includes limiting an angular acceleration of the air moving device to a first acceleration limit less than the maximum angular acceleration when changing the air moving device from a first rotational speed to a second rotational speed.

According to another aspect of this disclosure, a method of controlling an air moving device in an electronic system is disclosed. The air moving device is operable to accelerate between rotational speeds at a maximum angular acceleration. The method includes selectively controlling an angular acceleration of the air moving device when changing a rotational speed of the air moving device.

According to yet another aspect of this disclosure, an electronic system includes an air moving device selectively operable to rotate at a plurality of speeds in response to a control signal and a controller communicatively coupled to the air moving device. The controller is configured to generate the control signal and to selectively control an angular acceleration of the air moving device through the control signal when changing a rotational speed of the air moving device.

In another aspect of this disclosure, a method of controlling an air moving device in an electronic system in response to a change in an operating parameter of the electronic system is disclosed. The method includes delaying a change in a rotational speed of the air moving device in response to the change in the operating parameter.

According to an aspect of this disclosure, an electronic system includes an air moving device, a sensor for monitoring an operating parameter of the electronic system and generating a signal representative of the operating parameter, and a controller for controlling the air moving device. The controller is configured to selectively control a rotational speed of the air moving device, to receive the signal representative of the operating parameter, and to delay changing the rotational speed of the air moving device in response to the signal representative of the operating parameter.

In another aspect of this disclosure, an electronic system includes a first air moving device, a second air moving device, and a controller for controlling the first air moving device and the second air moving device. The controller is configured to selectively determine a target rotational speed for the first air moving device and the second air moving device. The controller is configured to control the first and second air moving devices to operate at a rotational speed approximately equal to the target rotational speed and a first rotational speed of the first air moving device is greater than a second rotational speed of the second moving device.

In yet another aspect of this disclosure, a method of controlling a plurality of air moving devices in an electronic system is disclosed. The method includes determining a target rotational speed for a plurality of fans and transmitting different control signals to the plurality of air moving devices. The different control signals cause the plurality of air moving devices to rotate at a plurality of different speeds near the target rotational speed and no two air moving devices of the plurality of air moving devices rotate at a same rotational speed.

According to still another aspect of this disclosure, an electronic system includes an air moving device and a controller for controlling the air moving device. The controller is configured to selectively control a rotational speed of the air moving device. The controller is configured to vary the rotational speed within a range bounded by and including a first rotational speed and a second rotational speed during a time that a target rotational speed is within the range.

In a further aspect of this disclosure, a method of controlling an air moving device in an electronic system includes varying a rotational speed of the air moving device within a range of rotational speeds that includes an intended rotational speed.

According to another aspect of this disclosure, an electronic system includes a memory storing data about a plurality of different models of air moving devices useable in the electronic system, and a controller for controlling the air moving device. The data includes at least one operating characteristic for each of the plurality of different models of air moving device. The controller is configured to monitor a response characteristic of the air moving device, compare the monitored response characteristic with operating characteristics stored in the memory, determine a model of the air moving device, and set operation parameters for the air moving device based on the stored data about said model of air moving device.

According to a further aspect of this disclosure, a method includes monitoring an operating condition of an electronic system, monitoring an operation characteristic of an air moving device in the electronic system, storing data over time of the operation characteristic of the air moving device of the air moving device correlated to the operating condition of the electronic system when the operation characteristic was monitored, and estimating a remaining life of the air moving device based on the stored data.

According to still another aspect of this disclosure, an electronic system includes an air moving device, a sensor for monitoring a temperature in the electronic system and generating a temperature signal, a memory, and a controller for controlling the air moving device. The controller is configured to monitor a rotational speed of the air moving device, to monitor the temperature via the temperature signal, and to store data over time to the memory including a duration of the rotational speed correlated with the monitored temperature for that duration.

According to yet another aspect of this disclosure, a method includes monitoring an operation characteristic of an air moving device in the electronic system, storing data over time of the operation characteristic of the air moving device, comparing the monitored operation characteristic with the stored data, and detecting, based on the comparison with the stored data, an impending failure of the air moving device.

In another aspect of this disclosure, an electronic system includes an air moving device, a memory, and a controller for controlling the air moving device. The controller is configured to monitor a current of the air moving device, to store data over time to the memory including the current of the air moving device, and to detect an impending failure of the air moving device based on the monitored current.

According to another aspect of this disclosure, an electronic system includes a plurality of air moving devices, a controller configured to control the plurality of air moving devices, and a user interface to allow a user to select an operating profile from a plurality of operating profiles for the plurality of air moving devices. The plurality of operating profiles includes a high efficiency profile, a low acoustic noise profile, a high cooling profile and a long life profile.

Some example embodiments of methods and electronic systems incorporating one of more of these aspects are described below. Additional aspects and areas of applicability will become apparent from the description below. It should be understood that various aspects of this disclosure may be implemented individually or in combination with one or more other aspects. It should also be understood that the description and specific examples herein are provided for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
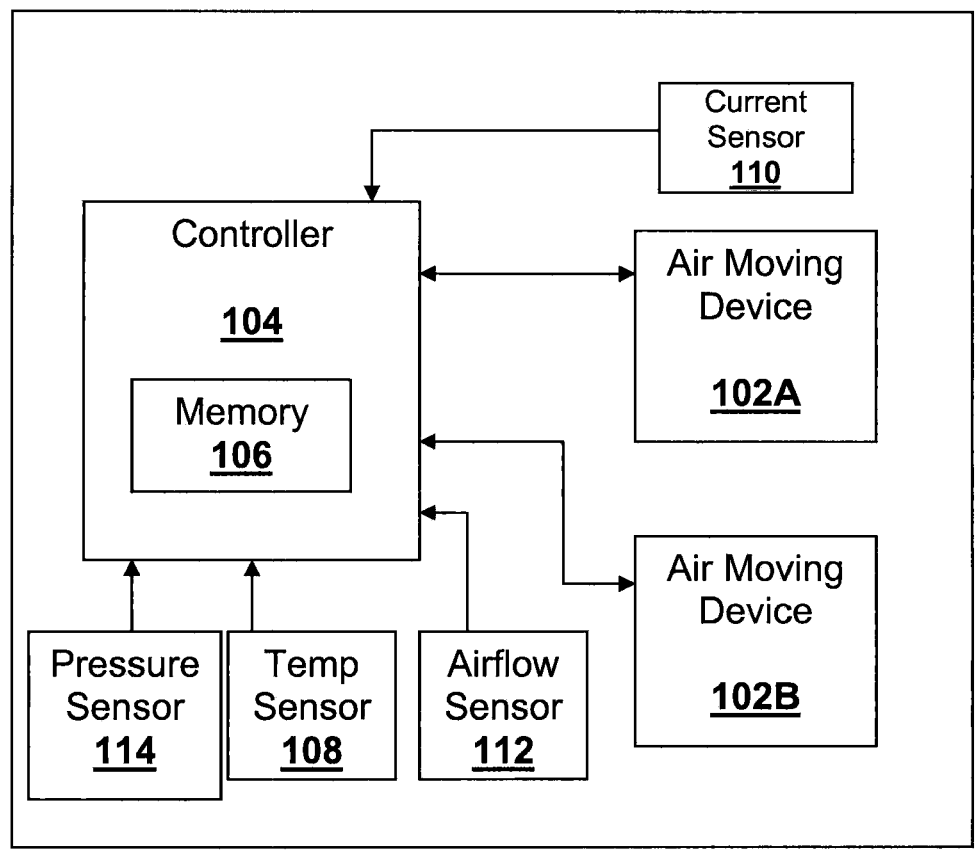
FIG. 1 is a block diagram of an electronic system including a controller having memory and a plurality of air moving devices according to aspects of this disclosure.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

An electronic system, generally indicated by reference numeral 100, embodying aspects of the present disclosure is shown in FIG. 1. The electronic system 100 includes air moving devices (AMDs) 102A, 102B (sometimes collectively referred to as AMDs 102) and a controller 104 for controlling the AMDs 102.

The controller 104 is a digital controller such as, for example, a microprocessor, etc. The controller 104 is communicatively coupled to the AMDs 102. The controller 104 generates a first control signal and provides the control signal to the AMD 102A to cause the AMD 102A to operate as desired by the controller 104. The controller 104 generates a second control signal and provides the control signal to the AMD 102B to cause the AMD 102B to operate as desired by the controller 104. The control signal may be any appropriate control signal for controlling operation of the AMDs 102 including, for example a pulse width modulated (PWM) control signal, a voltage, etc. When a PWM signal is used, the duty cycle of the PWM control signal instructs (or directly controls) the rotational speed of the AMD 102.

The AMDs 102 may be any suitable type of air moving device for use in the electronic system 100. In various embodiments, the AMDs 102 are fans. Although two AMDs 102 are illustrated in FIG. 1, more or fewer AMDs 102 may be included in the electronic system 100. Further, each AMD 102 may be an array of AMDs. An array of AMDs commonly includes more than one AMD 102 to be commonly operated (e.g., at the same time and at the same speed, etc.). The AMDs 102 may each include a tachometer for providing a signal representative of its rotational speed to the controller 104. Alternatively, a separate sensor, or sensors, may be used to generate a signal representative of the rotational speed of one or more AMD 102. Each AMD 102 is selectively controllable at various speeds between a minimum rotational speed (typically greater than zero and determined by the design and construction of the AMD 102) and a maximum rotational speed. Each AMD 102 will commonly have a maximum angular acceleration that is the fastest that the AMD 102 may accelerate between rotational speeds. As used herein, angular acceleration includes changing rotational speeds to speed up and/or slow down an AMD 102 (e.g., to include what is commonly referred to as acceleration and deceleration). A positive angular acceleration indicates a rotational speed increasing over time, while a negative angular acceleration indicates a rotational speed decreasing over time.

The controller 104 includes memory 106. The memory 106 typically will include instructions (e.g., software, firmware, etc.) for the controller 104. The instructions may configure the controller 104 to operate the AMDs 102 in a particular manner, monitor various operating parameters of the AMDs 102, monitor various operating conditions of the electronic system 100, etc. The memory 106 may also be used by the controller 104 to store data concerning the AMDs 102, and/or the electronic system 100, etc.

The controller 104 can monitor various operating conditions of the electronic system 100. For example, the electronic system 100 includes a temperature sensor 108. Temperature sensor 108 senses a temperature and provides a temperature signal representative of the sensed temperature to the controller 104. The sensed temperature may be any temperature. For example, the temperature may be an ambient temperature in the room in which the electronic system 100 is located, an ambient temperature in the electronic system 100, a temperature on and/or near a component of the electronic system 100, a temperature at an air inlet of the electronic system 100, a temperature at an air outlet of the electronic system 100, etc. Although only one temperature sensor 108 is illustrated, the electronic system 100 may include more than one temperature sensor 108. When multiple temperature sensors 108 are included, each temperature sensor 108 may be used to monitor a different temperature. For example, one temperature sensor 108 may sense an ambient temperature in the electronic system 100, one temperature sensor 108 may sense a temperature on and/or near a component of the electronic system 100, another temperature sensor 108 may sense a temperature at an air inlet of the electronic system 100, yet another temperature sensor 108 may sense a temperature at an air outlet of the electronic system 100, etc. The temperature signal(s) received by the controller 104 may be used for any suitable purpose including, for example, for determining a target (e.g. desired, goal, optimal, etc.) rotational speed for the AMDs 102, for detecting problems with one or more of the AMDs 102 and/or the electronic system 100, etc.

The electronic system 100 also includes a current sensor 110. The current sensor 110 senses the electrical current provided to the AMDs 102 and provides a signal representative of the current to the controller 104. Although one current sensor 110 is illustrated, in some embodiments, the electronic system 100 may include more than one current sensor 110 or no current sensor 110. In some embodiments, the electronic system 100 may include a separate current sensor 110 for each AMD 102. The current signal(s) received by the controller 104 may be used for any suitable purpose including, for example, for controlling the rotational speed of the AMDs 102, for detecting problems with one or more of the AMDs 102 and/or the electronic system 100, etc. The current sensor 110 may be any suitable type of current sensor including, for example, a current sense resistor, current transformer, a Hall Effect sensor, etc.

The electronic system 100 includes an airflow sensor 112. The airflow sensor 112 senses an airflow in the electronic system 100 and provides a signal representative of the airflow to the controller 104. The sensed airflow may be any airflow in the electronic system 100. For example, the airflow may be an airflow through an inlet to the electronic system 100, an airflow through an outlet of the electronic system 100, an inflow on and/or near a component of the electronic system 100, etc. Although one airflow sensor 112 is illustrated, the electronic system 100 may include more than one airflow sensor 112 or no airflow sensor 112. The airflow signal(s) received by the controller 104 may be used for any suitable purpose including, for example, for determining a target rotational speed of the AMDs 102, for detecting problems with one or more of the AMDs 102 and/or the electronic system 100, etc.

The electronic system 100 includes a pressure sensor 114. The pressure sensor 114 senses a pressure in the electronic system 100 and provides a signal representative of the pressure to the controller 104. The sensed pressure may be any pressure in the electronic system 100. For example, the pressure may be a pressure at an inlet to the electronic system 100, a pressure at an outlet of the electronic system 100, etc. Although one pressure sensor 114 is illustrated, the electronic system 100 may include more than one pressure sensor 114 or no pressure sensor 113. The pressure signal(s) received by the controller 104 may be used for any suitable purpose including, for example, for determining a target rotational speed of the AMDs 102, for detecting problems with one or more of the AMDs 102 and/or the electronic system 100, etc.

Figure 2:
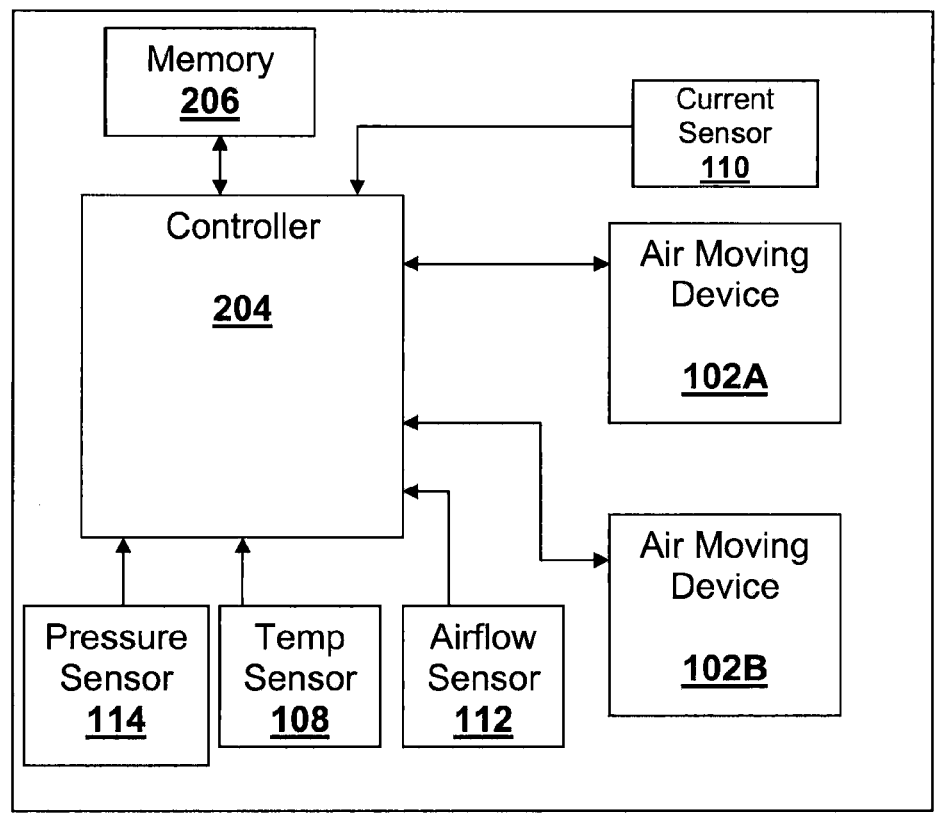
FIG. 2 is a block diagram of another electronic system including a controller, a memory and a plurality of air moving devices according to aspects of this disclosure.

In FIG. 2, another embodiment of an electronic system 200 includes a controller 204 and memory 206. The memory 206 is not part of the controller 204. In all other respects, the electronic system 200 is similar to the electronic system 100.

Figure 3:
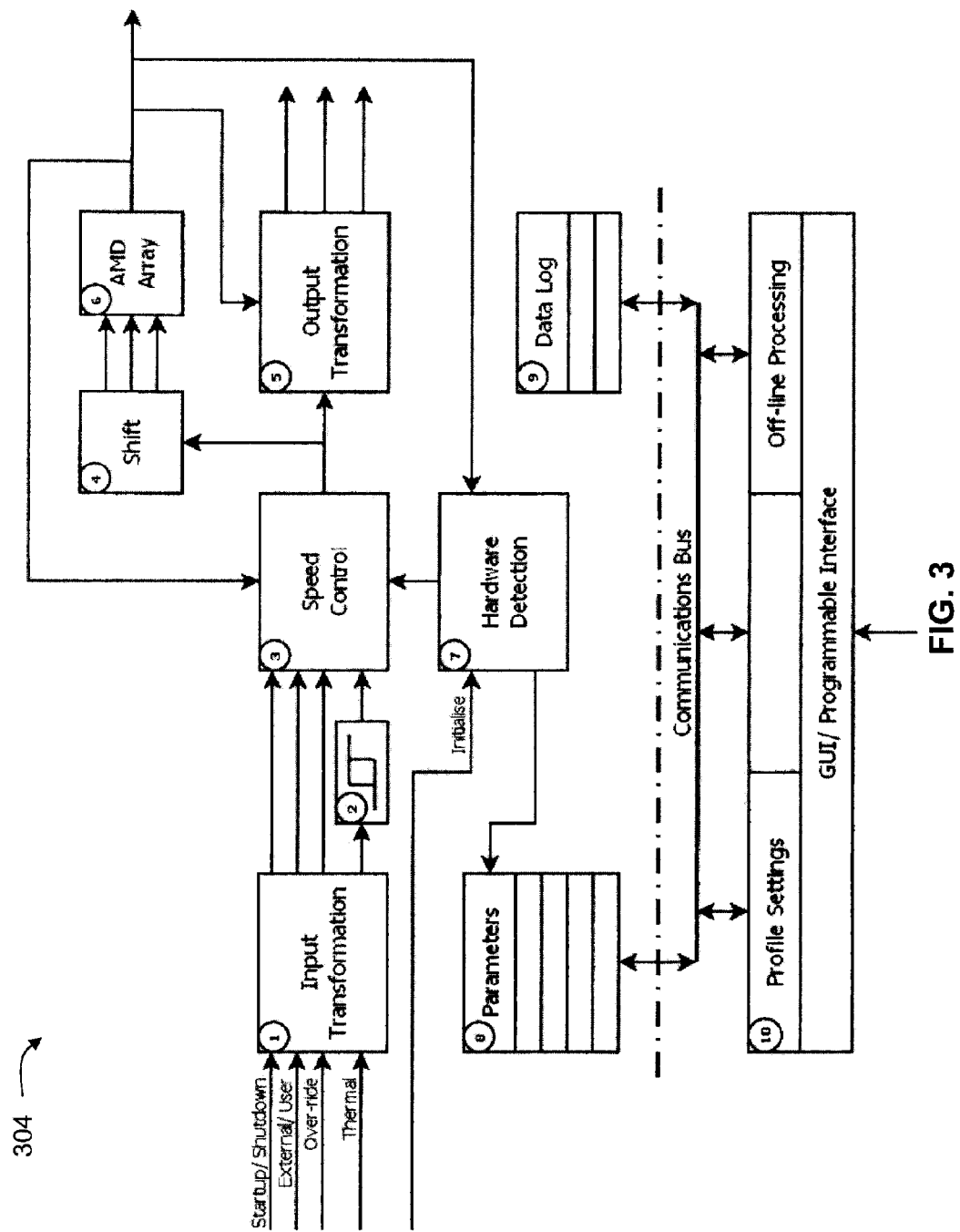
FIG. 3 is a functional block diagram of a controller for controlling air moving devices in an electronic system according to various aspects of this disclosure.

The aspects described herein may be utilized individually or combined in various combinations in an electronic system. An example embodiment of a controller 304 embodying the aspects described herein for controlling operation of an AMD is illustrated in FIG. 3. The controller 304 may be used in any of the electronic systems described herein (e.g., system 100, 200). The various blocks of the system 300 may be functional instruction blocks of the controller 304, may be physical components of the controller, or may be combinations of physical components and functional instructional blocks.

Also shown in FIG. 3 is a graphical user interface (GUI) for interfacing with the controller 304. The GUI may be part of the controller 304, may be part of the electronic system including the controller 304 (e.g., system 100, 200), may be part of a system hosting the electronic system including the controller 304, or may be part of a separate system.

Various aspects of this disclosure will be discussed with reference to the electronic system 100. It should be understood that the various aspects are applicable to other electronic systems including, for example, the electronic system 200 of FIG. 2. It should also be understood that the controller 104 discussed below may be or include the controller 304.

The rotation of the AMDs 102 commonly generates acoustic noise that a person located near the electronic system 100 may hear and perceive. Sudden and/or rapid changes in the rotational speed of the AMDs 102 may be particularly noticeable.

According to an aspect of the present disclosure, a method of controlling an air moving device in an electronic system is disclosed. The air moving device is operable to accelerate between rotational speeds at a maximum angular acceleration. The method includes limiting an angular acceleration of the air moving device to a first acceleration limit less than the maximum angular acceleration when changing the air moving device from a first rotational speed to a second rotational speed.

According to another aspect of this disclosure, a method of controlling an air moving device in an electronic system is disclosed. The air moving device is operable to accelerate between rotational speeds at a maximum angular acceleration. The method includes selectively controlling an angular acceleration of the air moving device when changing a rotational speed of the air moving device.

The controller 104 may determine to change the rotational speed of an AMD 102 for various reasons. The controller 104 may be commanded to change the rotational speed of one or more AMD 102. For example, the controller 104 may receive a signal indicating the electronic system 100 is starting-up or shutting down, a user may directly instruct the controller 104 (such as via a user interface) to change the rotational speed of a particular AMD 102, all AMDs 102, some combination of AMDs 102, etc. The controller 104 may additionally, or alternatively, determine that the rotational speed of one or more AMD 102 should be changed in response, for example, to a temperature signal, an air-flow signal, etc.

When the controller 104 is to change the rotational speed of an AMD 102 from a first rotational speed to a second rotational speed, the controller 104 changes the rotational speed of the AMD 102 while controlling the angular acceleration of the AMD 102. The controller 104 may limit the angular acceleration to a level that is less than the maximum angular acceleration. In some instances, as will be discussed below for example, the controller 104 may permit the AMD 102 to accelerate with its maximum angular acceleration. In contrast, if the controller 104 were to simply command the AMD 102 to change speed by, for example, simply changing the control signal to the AMD 102 to a control signal for the desired speed, the AMD 102 receiving the signal would typically accelerate at its maximum angular acceleration to the newly commanded speed. This uncontrolled acceleration may increase perceptible acoustic noise.

The controller 104 may control the angular acceleration of the AMDs 102 by various methods. For example, the controller 104 may adjust the control signal to the appropriate AMD 102 in a series of steps until the rotational speed of the AMD 102 reaches the desired rotational speed. The steps may be a series of PWM duty cycle steps, a series of voltage level steps, or other control signal steps, depending on the control signals appropriate to the particular AMD 102.

The angular acceleration may be controlled to maintain a constant angular acceleration, to vary angular acceleration proportional to the rotational speed, to vary the angular acceleration depending on whether the angular acceleration is positive or negative, to vary the angular acceleration based on a logarithmic division of the rotational speed change, to vary the angular acceleration using square, trapezoidal, sinusoidal, etc. waveforms, or according to any other suitable manner.

In some embodiments employing a constant rate angular acceleration, the controller 104 limits the positive angular acceleration to two hundred and fifty rpm per second (250 rpm/s) or less and limits the negative angular acceleration to four hundred and fifty rpm per second (450 rpm/s) or less. In other embodiments, other positive and/or negative acceleration rates may be employed. Angular acceleration of an AMD 102 may be less audibly perceptible when the acceleration is negative than when it is positive, permitting the angular acceleration to be larger when the angular acceleration is negative without increasing the perceptible noise over that generated when the angular acceleration is positive.

Acoustic noise generated by acceleration of an AMD 102 may be more perceptible to a listener when the AMD 102 is rotating at lower speeds and less perceptible when the AMD 102 is rotating at higher rotational speed. Thus, in some embodiments, the angular acceleration is varied based on the rotational speed of the AMD 102. The range of possible speeds of the AMD 102 is divided into several ranges. The controller 104 controls the angular acceleration based on which range the rotational speed of the AMD 102 is in at that time. The manner in which the angular acceleration is controlled, as well as the resulting acceleration, may vary between the ranges. For example, angular acceleration may be increased linearly in all of the ranges, but the magnitude of the angular acceleration may differ between ranges. Alternatively, or additionally, the angular acceleration may be controlled linearly in one or more ranges and controlled in a different manner in one or more range. In some embodiments, the AMD 102 is permitted to accelerate at about its maximum angular acceleration when the rotational speed is within at least one of the ranges. In some embodiments, the controller 104 permits greater magnitude angular acceleration of the AMDs 102 when the rotational speed is in a higher rotational speed range than when the rotational speed is in a lower rotational speed range.

According to another aspect of this disclosure, a method of controlling an air moving device in an electronic system in response to a change in an operating parameter of the electronic system is disclosed. The method includes delaying a change in a rotational speed of the air moving device in response to the change in the operating parameter.

As discussed above, the controller 104 may determine to change the rotational speed of an AMD 102 for various reasons. The controller 104 may be commanded to change the rotational speed of one or more AMD 102 and/or the controller 104 may determine that the rotational speed of one or more AMD 102 should be changed in response to an operating parameter such as, for example, a temperature signal, an air-flow signal, etc.

The change in the rotational speed of the AMD 102 may be delayed for a fixed length of time or a variable length of time. For example, the controller 104 may delay changing the rotational speed of the AMD 102 for a length of time that varies based on a magnitude of the change to be implemented. Thus, for example, if the temperature sensor 108 indicates a large change in the temperature and the controller 104 determines to greatly increase the rotational speed of the AMDs 102, the time delay may be very short (or even no delay) in order to decrease the likelihood of damage to the electronic system 100 caused by excessive temperature. Conversely, if the temperature sensor 108 indicates a small change in the temperature and the controller 104 determines to only slightly increase the rotational speed of the AMDs 102, the time delay may be relatively long. If the temperature indicated by the temperature signal decreases before the controller 104 increases the speed of the AMDs 102, the controller 104 may not need to change the speed of the AMDs 102 at all. Thus, the delay may prevent the controller 104 from unnecessarily changing the speed of the AMDs 102 in response to momentary fluctuations of the monitored operating parameter (whether caused by actual fluctuations, erroneous sensor signals, etc.).

The amount of delay may also be related to the magnitude of the monitored operating parameter. For example, the controller 104 may delay for a shorter time (including no delay) if the operating parameter is a temperature and the temperature is already relatively high. Because high temperatures may damage the electronic system 100, or components thereof, relatively quickly, it may be desirable to include only a short delay, or no delay at all, when the temperature is relatively high in order to limit the likelihood of damage to the electronic system 100. Conversely, when the temperature is low, and the risk of damage to the electronic system is lower, the controller 104 may delay changing the rotational speed of the AMDs 102 for a longer length of time.

The length of time of the delay may additionally, or alternatively, vary by being based on the change in the value of the monitored operating parameter. In such embodiments, the controller 104 is configured not to change the rotational speed of the AMDs 102 until the operating parameter reaches a threshold. The threshold may be a fixed value or may be a value relative to the initial operating parameter value. For example, the controller 104 may be configured not to change the speed of the AMD 102 until the temperature signal indicates that the temperature has increased or decreased by five degrees. Similarly, the controller 104 may be configured not to change the speed of the AMD 102 until the temperature indicated by the temperature signal has increased or decreased by five percent. The threshold above and below the initial value need not be the same. Hence, for example, the controller may be configured not to change the speed of the AMD 102 until the temperature increases by five degrees or decreases by ten degrees.

The amount of delay, or whether any delay is used, may vary between AMDs 102. For example, if AMD 102A is directly cooling a highly temperature sensitive component of the electronic system 100, the controller may be configured not to delay any changes in the speed of AMD 102A. Despite introducing no delay into changes in the speed of AMD 102A, if AMD 102B is not cooling a highly temperature sensitive component, the controller 104 may delay changing the speed of AMD 102B according to the aspects disclosed herein.

In various embodiments, introduction of delay into the control of the AMDs 102 may provide benefits to the electronic system 100 including, for example, more energy efficient operation, more stable cooling, lower acoustic noise, etc.

According to another aspect, a controller for an air moving device in an electronic system transforms output signals of the air moving device to a format expected by a system hosting the electronic system and transforms signals from the system hosting the electronic system to a format usable by the air moving device.

In various embodiments, the electronic system 100 is hosted by (e.g., incorporated in, coupled to, part of, etc.) another system. The host system may not know the type of AMD 102 and may not know the format of signal needed to control the AMD 102. Thus, the controller 104 acts as an interpreter to transform signals between the host system and the AMD 102. The controller 104 is configured to receive signals from the host system (e.g., commanded speed signals, etc.) and output appropriate control signals to the AMDs 102. Feedback from the AMDs 102 (e.g., tachometer signals), may also be converted by the controller 104 to the format expected by the host system. Accordingly, the host system not only may not know the type of AMD 102, but also need not know the type of AMD 102. This may permit, among other things, any type of AMD 102 be used in the electronic system 100

In one example embodiment, the electronic system 100 is incorporated in a host system. The host system expects to control airflow from the AMDs 102 using analog voltage control and to monitor the rotational speed of the AMDs 102. The AMDs 102, however, are controlled by PWM control signals and have rotational speed and airflow characteristics that differ from those expected by the host system. Further, the host system requires that any demand above a certain voltage be treated as exceptional and requires the AMDs 102 operate at full speed. The PWM control signal duty cycle and corresponding rotational speed of the AMDs 102 at various airflow rates are calculated. The relationship between the control voltages generated by the host system and the corresponding PWM signal is mapped and stored to the memory 106 in, for example, a look-up table. Similarly, the actual rotational speed for the AMDs 102 and the speed expected by the host system for various control signals are mapped and stored to the memory 106. Thus, when the host system outputs a voltage level, thereby indirectly commanding a particular airflow, the controller 104 looks up the corresponding PWM signal needed to operate the AMDs 102 to produce the commanded airflow and provides the appropriate PWM control signal to the AMDs 102. Similarly, the controller can look up the speed signal received from the AMDs 102 to convert it to the speed signal expected by the host system for the speed at which the AMDs 102 are actually operating. This function of the controller 104 is transparent to the host system. The host system is unaware that the AMDs 102 are not the type of AMDs that it is expecting and for which it is outputting control signals and monitoring speed. This may permit any AMD 102 that can be appropriately mapped to be used in a host system without the host system needing to be reprogrammed, reconfigured, etc.

According to yet another aspect of the present disclosure, a method of controlling a plurality of air moving devices in an electronic system is disclosed. The method includes determining a target rotational speed for a plurality of fans and transmitting different control signals to the plurality of air moving devices. The different control signals cause the plurality of air moving devices to rotate at a plurality of different speeds near the target rotational speed and no two air moving devices of the plurality of air moving devices rotate at a same rotational speed.

When two air moving devices of the same type receive the same control signal, the two air moving devices theoretically will operate at the same nominal speed. For various reasons including, for example, manufacturing differences between the different individual air moving devices (even those of a same model from a same manufacturer), distance from the controller 104, effects from other components nearby, temperature differences, debris, wear of the particular air moving device, etc., the actual rotational speed of the air moving devices are often slightly different. When two air moving devices operate at nearly, but not quite, the same speed, they generate two acoustic waves of nearly the same frequency. These two waves may combine producing a resultant wave that is modulated by the difference in their frequencies. This produces a phenomenon known as beating. Beating may result in audible oscillations of the noise level of the air moving devices.

Thus, in some embodiment, the controller 104 deliberately separates the rotational speeds of two air moving devices (e.g., 102A and 102B) that would otherwise be driven at the same nominal rotational speed. The control signals to one or both of the AMDs 102 may be altered. One AMD 102 may be driven at the nominal, target rotational speed, while the other AMD 102 is driven at a higher or lower speed. Alternatively, one AMD 102 may be driven at a rotational speed above the target rotational speed, while the other AMD 102 is driven at a speed below the target rotational speed. The amount of separation between the speed of the first AMD 102 and the second AMD 102 may be sufficient to limit or eliminate beating.

According to still another aspect of this disclosure, a method of controlling an air moving device in an electronic system comprises varying a rotational speed of the air moving device within a range of rotational speeds that includes an intended rotational speed.

In some embodiments according to this aspect, the controller 104 is configured to vary the control signals provided to the AMDs 102 within a range of rotational speeds that contains the intended rotational speed for the AMDs 102. Thus, instead of simply providing a control signal to cause the AMDs 102 to operate at the intended rotational speed, the controller 104 provides different control signals over time to cause the rotational speed of the AMDs 102 to vary over time within a band around the intended rotational speed. The upper and lower limits of the range (sometimes called a band) may be defined by a first rotational speed above and a second rotational speed below the intended rotational speed.

The rotational speed of the AMDs 102 may be varied by, for example, cycling the rotational speed between the first rotational speed, the intended rotational speed and the second rotational speed. The rotational speed of the AMDs 102 may be swept between the first rotational speed and the second rotational speed. The rotational speed of the AMDs 102 may be randomly or pseudo-randomly varied among rotational speed within the range. Any other suitable method of varying the rotational speed of the AMDs 102 may also be used.

Discrete acoustic tones may be generated by AMDs 102, particularly at a pole pass frequency and higher harmonics thereof. These tones can be distinct and may be known as prominent tones when they exceed an ambient acoustic noise level by a sufficient margin. By introducing variation into the control signals provided to the AMDs 102, as discussed herein, prominent tones may be eliminated or reduced.

According to another aspect of this disclosure, a controller for controlling an air moving device in an electronic system is configured to monitor a response characteristic of the air moving device, compare the monitored response characteristic with operating characteristics stored in memory of the electronic system, determine a model of the air moving device, and set operation parameters for the air moving device based on the stored data about said model of air moving device.

Thus, by this aspect, the electronic system 100 may automatically determine what type of air moving device the AMDs 102 are and appropriate control parameters for that type of air moving device may be set by the controller 104 for use in controlling the AMDs 102.

In some embodiments, the memory 106 includes data about a plurality of different models of air moving devices useable in the electronic system 100. The data includes at least one operating characteristic for each of the plurality of different models. The operating characteristic may be, for example, rotational speed in response to a prescribed control signal, time to change speed between prescribed limits, a minimum rotational speed, maximum rotational speed, temperature, airspeed, air pressure, etc. in response to a prescribed control signal, etc. One or more of such operating characteristics for each model of air moving device may be stored in the memory 106. Accordingly, the controller 104 may operate (or attempt to operate) the AMDs 102 and may monitor one or more of the operating characteristics. The monitored operating characteristic(s) are compared by the controller 104 to the stored data in the memory 106 to determine what model of air moving device the AMDs 102 are. Once the model is known, the controller 104 may set appropriate operating parameters for controlling the AMDs 102 based on the data about that model stored in the memory 106.

According to another aspect of this disclosure, a method includes monitoring an operating condition of an electronic system, monitoring an operation characteristic of an air moving device in the electronic system, storing data over time of the operation characteristic of the air moving device correlated to the operating condition of the electronic system when the operation characteristic was monitored, and estimating a remaining life of the air moving device based on the stored data.

In some embodiments, the controller 104 monitors an operation characteristic of the air moving devices 102 and stores data about the operation characteristic to the memory 106. The operation characteristic may be any suitable operation characteristic of the AMDs 102 including, for example the rotational speed of the AMDs 102, number of on/off cycles of the AMDs 102, etc. Thus, in some embodiments, the controller 104 stores data indicating the length of time the AMDs 102 were operated at a particular speed.

The controller 104 also monitors and stores data concerning an operating condition of the electronic system 100. The operating condition may be, for example, the temperature detected by the temperature sensor 108, a load attached to the electronic system (if, for example, the electronic system is a power supply), etc. The operating condition data is also stored to the memory 106 and is correlated with the operation characteristic data. Thus, for example, the data stored in the memory 106 may indicate not only how long the AMDs operated at a particular speed, but what the temperature in the electronic system was during that time.

Figure 4:
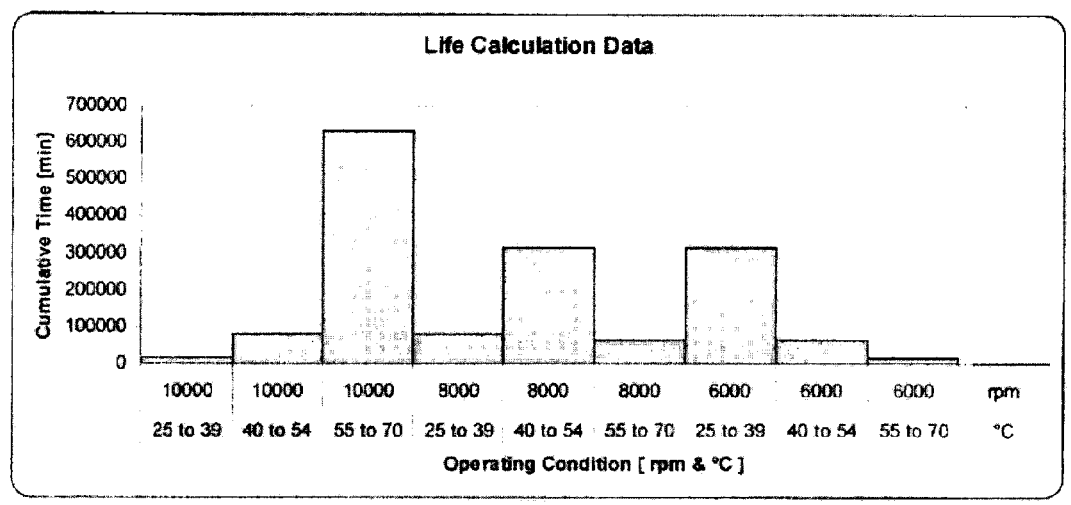
FIG. 4 is a histogram illustrating an example data correlating ranges of rotational speed of air moving devices and ranges of temperatures in an electronic system including the air moving devices.

The data monitored may be stored as discrete values or may be mapped to categories (also referred to as ranges). For example, the possible rotational speeds may be assigned to two or more ranges and the temperature may be assigned to two or more ranges. The data stored in memory would indicate how long the AMDs 102 operated in a first speed range while the temperature was within a first temperature range. Similarly, the data would indicate how long the AMDs 102 operated within a second speed range while the temperature was within the first temperature range and how long the AMDs 102 operated within the first speed range while the temperature was within a second temperature range, etc. Although two speed ranges and two temperature ranges were discussed, more or fewer ranges of operating conditions and operation characteristics may be used. Further more than one operating condition and/or more than one operation characteristic may be used. For example the controller 104 may monitor and store to the memory 106, the rotational speed of the AMDs 102, the current provided to the AMDs, the ambient temperature of the room in which the electronic system is located, the ambient temperature within the electronic system, etc. FIG. 4 is a histogram illustrating an example of such data correlating ranges of rotational speed of the AMDs 102 and ranges of temperatures.

The data thus stored in the memory 106 may be used to estimate the remaining life (or the estimated time to failure) of the AMDs 102. In some embodiments, the controller 104 estimates the remaining life of the AMDs 102. In some embodiments, the data stored in the memory 106 may be output from the electronic system 100 to another system for estimating the remaining life of the AMDs 102. The other system may be an unrelated system or may be a system hosting the electronic system 100.

According to another aspect of this disclosure, a method includes monitoring an operation characteristic of an air moving device in the electronic system, storing data over time of the operation characteristic of the air moving device, comparing the monitored operation characteristic with the stored data, and detecting, based on the comparison with the stored data, an impending failure of the air moving device.

In some embodiments, the controller 104 monitors an operation characteristic of the air moving devices 102 and stores data about the operation characteristic to the memory 106. The operation characteristic may be any suitable operation characteristic of the AMDs 102 including, for example the rotational speed of the AMDs 102, number of on/off cycles of the AMDs 102, electrical current provided to the AMDs 102, etc. The stored data may be correlated to other data such as, for example, an operating condition of the electronic system 100 or may be uncorrelated.

The controller 104 may compare the monitored operation characteristic to the data stored to the memory 106, effectively comparing current operation characteristics with historical operation characteristics including, for example the original operation characteristics of the AMDs 102. By making such comparisons, the controller may detect certain impending failures of the AMDs 102. For example a gradual increase in current over time may indicate an AMD 102 is likely to fail. Accordingly, in some embodiments, the controller 104 is configured to provide an alert when the current, detected, for example, by the current sensor 110, reaches a threshold value. In some embodiments, the controller 104 is configured to provide an alert when one or more operation characteristic exhibits sudden or erratic changes.

According to still another aspect of this disclosure, an electronic system includes a plurality of air moving devices, a controller configured to control the plurality of air moving devices, and a user interface to allow a user to select an operating profile from a plurality of operating profiles for the plurality of air moving devices. The plurality of operating profiles includes a high efficiency profile, a low acoustic noise profile, a high cooling profile and a long life profile.

Thus, in some embodiments, the electronic system 100 includes a user interface (e.g., graphic user interface, etc.) to allow a user to select an operating profile from a plurality of profiles. The controller 104 is configured to operate the AMDs 102 according to the selected operating profile. In some embodiments, the selectable operating profiles may incorporate one or more aspects described above.

The selectable operating profiles may include a high efficiency operating profile. Air moving devices may operate at maximum efficiency around the center of their range of rotational speeds. Electronic systems, however, often operate more efficiently when temperatures are lower. The high efficiency operating profile attempts to balance efficiency of the AMDs 102 with the efficiency of the electronic system 100. In some embodiments, the controller 104 may be configured to operate with high efficiency by measuring input power and output power of the electronic device at various rotational speeds of the AMDs 102 and locating a maximum efficiency point. In some embodiments, the controller 104 may operate at a high efficiency without direct power measurement such as, for example, by use of other parameters that vary with power or efficiency, monitoring rotational speed of the AMDs 102, etc. In some embodiments, the controller 104 is configured to maintain a minimum rotational speed for the AMDs 102 regardless of the efficiency to ensure adequate cooling of the electronic system 100.

The selectable profiles may include a low acoustic noise profile. Several aspects were discussed above that may reduce acoustic noise produced by AMDs 102. The low acoustic noise profile may incorporate one or more of the aforementioned aspects to reduce acoustic noise. The low acoustic noise profile may also cause the controller 104 to operate the AMDs 102 at a rotational speed that will provide adequate cooling of the electronic system 100. The temperature measured by the temperature sensor 108 may be allowed to approach a maximum allowable temperature for the electronic system 100 under the low acoustic noise profile. One or more particular rotational speeds (or ranges of rotational speeds) of the AMDs 102 may be prohibited to the controller 104 under the low acoustic noise profile. For example, certain frequencies may excite a resonance in the electronic system 100 and generate noticeable audible noise. By prohibiting the controller 104 from operating the AMDs 102 at those frequencies, audible noise may be reduced.

The selectable profiles may include a maximum cooling profile. When the maximum cooling profile is selected, the controller 104 operates all AMDs 102 at their maximum rotational speed regardless of efficiency, noise, temperature, etc.

The selectable profiles may include a maximum AMD life profile. Typically, lower rotational speeds and lower ambient temperatures are better for extending the life of an air moving device than high temperatures and/or high operating speeds. Operating the AMDs 102 at lower rotational speeds, however, may increase the ambient temperature in the electronic system 100. Accordingly, under the maximum AMD life profile, the controller 104 is configured to monitor the rotational speed of the AMDs 102 and the ambient temperature in the electronic system 100 to estimate the remaining life of the AMDs 102 (in the manner discussed above). The controller 104 may also be configured to adjust the rotational speed of the AMDs 102 to optimize the estimated remaining life of the AMDs 102. The remaining life may also be estimated using look-up tables stored in the memory 106. In some embodiments, the controller 104 is configured to maintain a minimum rotational speed for the AMDs 102 regardless of the affect on estimated remaining life to ensure adequate cooling of the electronic system 100.

In any of the examples disclosed herein, the electronic system may be any electronic system that includes one or more air moving devices. Furthermore, the electronic system may be included as part of another electronic system or systems (e.g., a host system). The electronic system may also control one or more air moving devices in such a host system. For example, the electronic system may be a power supply including one or more air moving devices controlled by a controller in the power supply according to one or more aspects of this disclosure. Alternatively, or additionally, the power supply may be included as part of another system (e.g., a computer or other system to which the power supply is supplying power). The power supply may additionally, or alternatively, control one or more air moving device in, for example, the computer hosting the power supply according to one or more aspect of this disclosure.

The controllers disclosed herein may be any suitable controller for controlling operation of an air moving device according to the various aspects disclosed herein. The controller may be, for example, a digital controller. The controller may be, for example a microprocessor, a DSP, etc. The controller may be a discrete component or may include more than one discrete components operatively coupled together to function as a controller disclosed herein. Further, the controller may include analog components and/or digital components. In embodiments that include memory, the controller may include the memory or the memory may be separate from the controller.

Although the aspects and embodiments disclosed herein are described with respect to air moving devices, it should be understood that air moving devices are generally electric motors with fan blades attached thereto. Various aspects of this disclosure may, accordingly, be applied to any rotating mechanical device including, for example, electric motors.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method of controlling an air moving device in an electronic system in response to a change in an operating parameter of the electronic system, the air moving device configured to cool the electronic system, the method comprising delaying a change in a rotational speed of the air moving device by a variable length of time in response to the change in the operating parameter, and adjusting the variable length of time based on a sensed magnitude of the operating parameter or a sensed magnitude of a change in the operating parameter.

2. The method of claim 1 wherein the operating parameter is a temperature in the electronic system.

3. The method of claim 2 wherein the variable length of time is a selected length of time.

4. The method of claim 3 wherein the selected length of time is variable based on the magnitude of the change in the temperature.

5. The method of claim 3 wherein the selected length of time is variable based on the magnitude of the temperature.

6. The method of claim 2 wherein delaying the change in the rotational speed of the air moving device includes delaying the change in the rotational speed of the air moving device until the temperature reaches a threshold value.

7. The method of claim 2 wherein delaying the change in the rotational speed of the air moving device includes delaying the change in the rotational speed of the air moving device until the magnitude of the change in the temperature reaches a threshold value.

8. An electronic system comprising:
an air moving device configured to cool the electronic system;
a sensor for monitoring an operating parameter of the electronic system and generating a signal representative of the operating parameter; and
a controller for controlling the air moving device, the controller configured to selectively control a rotational speed of the air moving device, to receive the signal representative of the operating parameter, to delay changing the rotational speed of the air moving device by a variable length of time in response to the signal representative of the operating parameter, and to adjust the variable length of time based on a sensed magnitude of the operating parameter or a sensed magnitude of a change in the operating parameter.

9. The electronic system of claim 8 wherein the sensor is a temperature sensor and the operating parameter is a temperature.

10. The electronic system of claim 9 the variable length of time is a selected length of time.

11. The electronic system of claim 10 wherein the selected length of time is variable based on the magnitude of the change in the temperature.

12. The electronic system of claim 10 wherein the selected length of time is variable based on the magnitude of the temperature.

13. The electronic system of claim 9 wherein the controller is configured to delay changing the rotational speed of the air moving device in response to the signal representative of the temperature until the temperature reaches a threshold value.

14. The electronic system of claim 9 wherein the controller is configured to delay changing the rotational speed of the air moving device in response to the signal representative of the temperature until the magnitude of the change in the temperature reaches a threshold value.

15. An electronic system comprising:
a memory storing data about a plurality of different models of air moving devices useable in the electronic system, the data including at least one operating characteristic for each of the plurality of different models of air moving devices, the at least one operating characteristic being one of a time to change speed between prescribed limits, a minimum rotational speed, a maximum rotational speed, temperature, airspeed, and air pressure; and
a controller for controlling an air moving device, the controller configured to monitor a response characteristic of the air moving device, compare the monitored response characteristic with operating characteristics stored in the memory, determine a model of the air moving device, and set operation parameters for the air moving device based on the stored data about said model of air moving device.

16. The electronic system of claim 15 wherein the monitored response characteristic is any one or more of a rotational speed of the air moving device in response to a specified PWM control signal, a temperature while the air moving device is operated with a specified PWM control signal, an air speed while the air moving device is operated with a specified PWM control signal, a pressure while the air moving device is operated with a specified PWM control signal, a minimum rotational speed of the air moving device, a maximum rotational speed of the air moving device, and a time to change from a first rotational speed to a second rotational speed.

17. The electronic system of claim 15 wherein the controller is configured to monitor a plurality of additional response characteristics of the air moving device, compare the monitored additional response characteristics with operating characteristics stored in the memory, and determine the model of the air moving device based on the monitored response characteristic and the monitored additional response characteristics.

\* \* \* \* \*